(12) United States Patent
Linz et al.

(10) Patent No.: US 6,424,674 B1
(45) Date of Patent: Jul. 23, 2002

(54) MULTI-TONE TRANSCIEVER FOR MULTIPLE USERS

(75) Inventors: Alfredo R. Linz; Terry L. Cole; Vijayakumaran V. Nair, all of Austin, TX (US)

(73) Assignee: Legerity, Inc., Austin, TX (US)

(*) Notice: Subject to any disclaimer, the term of this patent is extended or adjusted under 35 U.S.C. 154(b) by 0 days.

(21) Appl. No.: 09/236,122

(22) Filed: Jan. 22, 1999

(51) Int. Cl.[7] .................................................. H04B 1/38
(52) U.S. Cl. ........................................ 375/220; 375/219
(58) Field of Search ................................ 375/219, 220, 375/222, 295, 298, 262, 260; 370/321, 337, 347, 278, 280, 282, 294, 230, 232, 235

(56) References Cited

U.S. PATENT DOCUMENTS 5,521,906 A * 5/1996 Grube et al. ................ 370/17
5,742,639 A * 4/1998 Fasulo, II et al. ........... 375/219
5,742,640 A * 4/1998 Haoui et al. ................ 375/220
5,838,667 A * 11/1998 Bingham et al. ........... 370/294
6,144,696 A * 11/2000 Shively et al. .............. 375/222

FOREIGN PATENT DOCUMENTS

WO          WO 98/10546      * 3/1998   ........... H04L/27/26

* cited by examiner

Primary Examiner—Chi Pham
Assistant Examiner—Dung X. Nguyen
(74) Attorney, Agent, or Firm—Williams, Morgan & Amerson, P.C.

(57) ABSTRACT

A method and apparatus are provided for supporting a plurality of user transceivers with a host transceiver. The method includes allocating at least one symbol of a DMT frame to a first user transceiver of the plurality of transceivers, providing a control signal from a second user transceiver of the plurality of transceivers to the host transceiver, allocating at least one symbol of the DMT frame to the second user transceiver in response to the control signal.

36 Claims, 5 Drawing Sheets

MULTI-TONE TRANSCIEVER FOR MULTIPLE USERS

BACKGROUND OF THE INVENTION

1. Field of the Invention

This invention relates generally to telecommunications, and, more particularly, to a multi-tone transceiver for multiple users.

2. Description of the Related Art

In communications systems, particularly telephony, it is common practice to transmit signals between a subscriber station and a central switching office via a two-wire bi-directional communication channel. A line card generally connects the subscriber station to the central switching office. The primary functions of the line card range from supplying talk battery to performing impedance matching to handling ringing signal, voice and data signals, and testing signals. Until recently, line cards generally supported only the Plain Old Telephone System (POTS). However, a recent trend has been to utilize line cards to support protocols for transmission of digital data.

The Plain Old Telephone System, designed primarily for voice communication, provides an inadequate data transmission rate for many modem applications. To meet the demand for high-speed communication, designers sought innovative and cost-effective solutions that would take advantage of the existing network infrastructure. Several technological advancements were proposed in the telecommunications industry that made use of the existing network of telephone wires. The most promising of these technologies is the xDSL technology.

DSL is making the existing network of telephone lines more robust and versatile. Once considered virtually unusable for broadband communications, an ordinary twisted pair equipped with DSL interfaces can transmit videos, television, and very high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as one of the more promising and viable options.

DSL technologies leave Plain Old Telephone Service undisturbed. Traditional analog voice band interfaces use the same frequency band, 300 Hertz (Hz)–4 Kilohertz (KHz), as telephone service, thereby preventing concurrent voice and data use. A DSL interface, on the other hand, operates at frequencies above the voice channels from about 30 KHz to 1.1 Megahertz (MHz). Thus, a single DSL line is capable of offering simultaneous channels for voice and data.

DSL systems use digital signal processing (DSP) to increase throughput and signal quality through common copper telephone wire. It provides a downstream data transfer rate from the DSL Point-of-Presence (POP) to the subscriber location at speeds of up to 6 Mega-bits per second (MBPS). Even a more modest transfer rate of 1.5 MBPS, for instance, is fifty times faster than a conventional 28.8 kilobits per second (KBPS).

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface, Rev. R6, dated Sep. 26, 1997, incorporated herein by reference in its entirety.

ADSL modems use two competing modulation schemes: discrete multi-tone (DMT) and carrierless amplitude/phase modulation (CAP). DMT is the standard adopted by the American National Standards Institute.

The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 KHz times the tone number. Tones 1–7 are reserved for voice band and guard band (i.e., tone 1 is the voice band and tones 2–7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

A typical point-to-point ADSL connection uses an ADSL transceiver at the central office (CO) connected to another ADSL transceiver via a subscriber line. At the CO, a plurality of transceivers is located on a line card. However, the number of transceivers that can be placed on one line card is limited because of space constraints and power dissipation concerns. As a result, the ADSL service is available to a relatively small fraction of all potential users. Additionally, the processors of the ADSL transceivers are not always efficiently utilized, particularly between downloads, where the ADSL processors are essentially idling. Thus, the inefficient use of the ADSL processors limits the number of users that can have access to a multi-tone transceiver at any given time.

The present invention is directed to overcoming, or at least reducing the effects of, one or more of the problems set forth above.

SUMMARY OF THE INVENTION

In one aspect of the present invention, a method is provided for supporting a plurality of user transceivers with a host transceiver. The method includes allocating at least one symbol of a DMT frame to a first user transceiver of the plurality of transceivers, providing a control signal from a second user transceiver of the plurality of transceivers to the host transceiver, allocating at least one symbol of the DMT frame to the second user transceiver in response to the control signal.

In one aspect of the present invention, an apparatus is provided. The apparatus includes a transmit block capable of transmitting data within a first portion of a DMT frame to a first user transceiver over a first connection. The apparatus includes a control block adapted to receive a control signal over a second connection, the control block capable of allocating a second portion of the DMT frame to a second user transceiver for data transmission in response to the control signal.

BRIEF DESCRIPTION OF THE DRAWINGS

The invention may be understood by reference to the following description taken in conjunction with the accompanying drawings, in which like reference numerals identify like elements, and in which.

Figure 1:
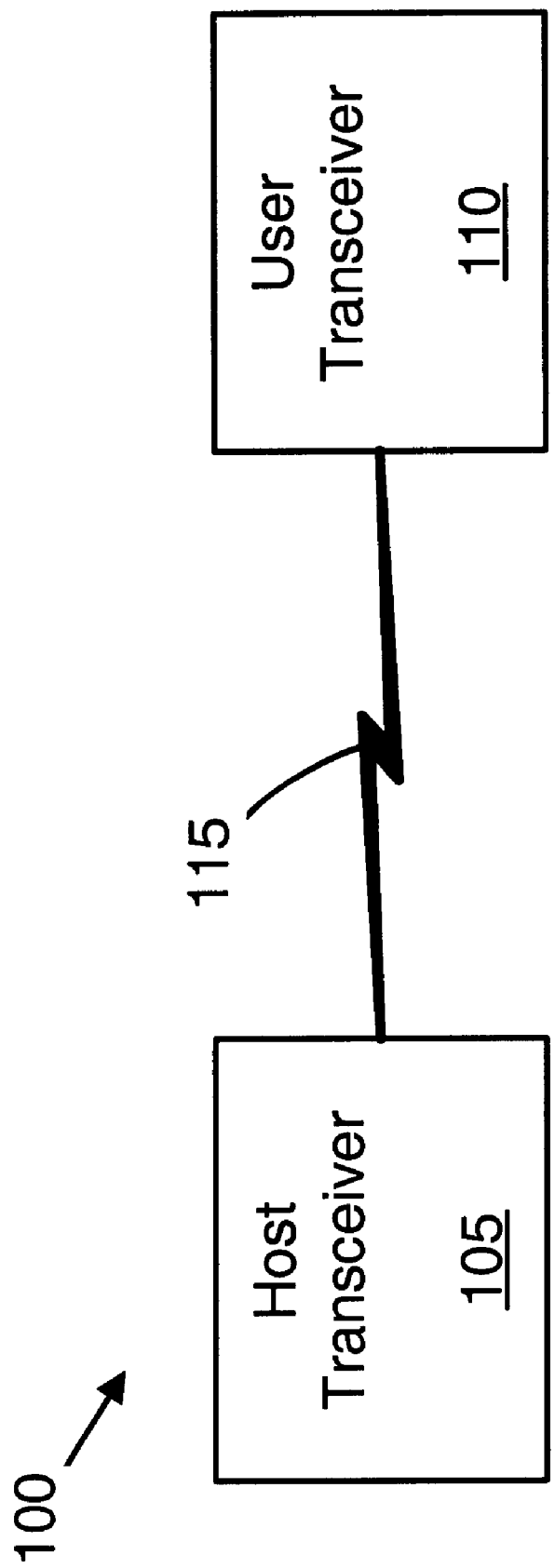
FIG. 1 illustrates a stylized block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, a communications system 100 in accordance with the present invention is illustrated. The communications system 100 includes a host transceiver 105 and a user transceiver 110 capable of communicating with each other over a connection 115. The connection 115 may be either a wire-line connection or a wire-less connection, depending on the application. Generally, the host and user transceiver 105, 110 communicate with each other using a common communications protocol (i.e. a communications standard such as ADSL, ISDN, DECT, TCP/IP etc.) that defines the transmission parameters such as the format of data to be transmitted, error checking algorithm, retransmission scheme, and the like. The host and user transceivers 105, 110 may be a pair of modems, fax machines, cellular phones, or any other devices capable of communicating with each other.

Figure 2:
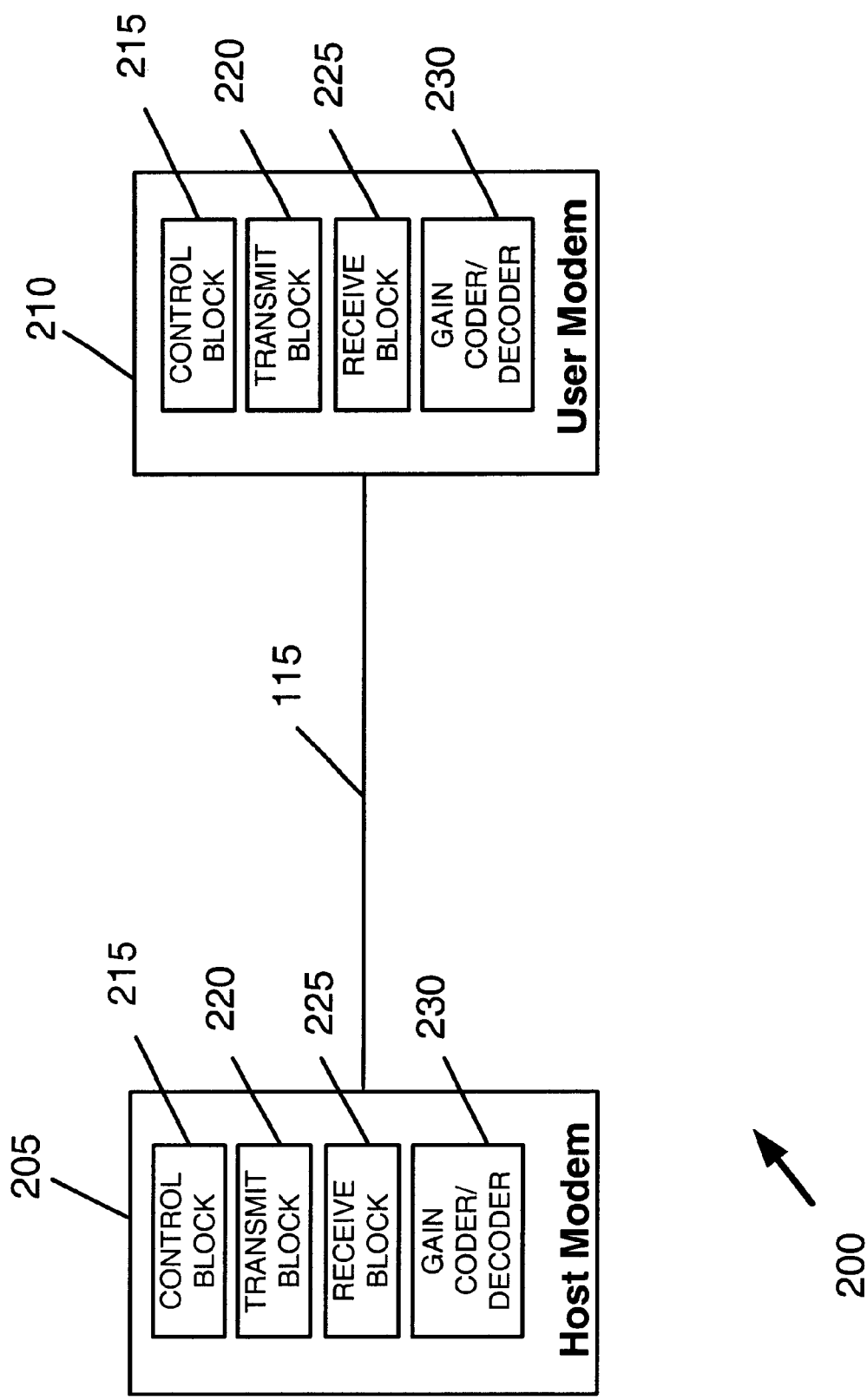
FIG. 2 depicts a stylized block diagram of a specific embodiment of the communications system of FIG. 1 in accordance with the present invention.

FIG. 2 illustrates one embodiment of a communications system 200 in accordance with the present invention. FIG. 2 illustrates a host transceiver 105 that supports one or more of the user transceivers 110 over one or more of the connections 115. Specifically, in the illustrated embodiment, the host transceiver is an ADSL (host) modem 205, the user transceivers 110 are ADSL (user) modems 210(a–n), and the connections 115 are telephone lines 215(a–n). In one embodiment, the host modem 205 may be located in a central office of a telephone service provider, and the user modems 210(a–n) may be located in customer premises (CP), which could include homes, businesses, or the like. Typically, the host modem 205 will couple the user modems 210(a–n) to another service provider through the central office. For example, if an individual at one of the customer premises desires Internet service, then a connection is usually made between one of the user modems 210(a–n) and an Internet Service Provider (ISP) via the host modem 205 at the central office.

The host and user modems 205, 210(a–n) are DMT ADSL modems, wherein the host modem 205 generates the tones necessary for compatibility with the user modems 210(a–n). The host and user modems 205, 210(a–n) communicate with each other using a certain number of these tones for data transmission. Although the host and user modems 205, 210(a–n) have the capability of transmitting on all of the 256 allocated tones, they usually use only a portion of these tones for typical data transmissions. This generally results because most applications that are run by a user at the customer premises will not require the peak 8 MBPS capacity typically offered by the ADSL DMT modems 205, 210(a–n). The capacity offered by the ADSL DMT modems 205, 210(a–n) generally depends on the quality (i.e., the clarity) of the communication channel and that all 256 tones are usable by the modems 205, 210(a–n).

Each user modem 210(a–n) comprises a control block 220(a–n), transmit block 230(a–n), and receive block 240(a–n). The control block 220(a–n) is capable of transmitting and receiving control signals to and from the host modem 205. The control signals, described in more detail below, may include information such the transmission rate, the priority scheme (i.e., class of ADSL service), and the like. In accordance with the present invention, the transmit block 230(a–n) and the receive block 240(a–n) are capable of respectively transmitting and receiving data to and from the host modem 205 over a portion of a DMT frame. The portion of the DMT frame utilized for transmitting and receiving data is identified by the control block 220(a–n). It is contemplated that the transmit block 230(a–n) and receive block 240(a–n) can be implemented in a variety of ways by those skilled in the art having the benefit of this disclosure. Accordingly, the transmit and receive blocks 230(a–n), 240(a–n) will not be described in detail herein.

Figure 3:
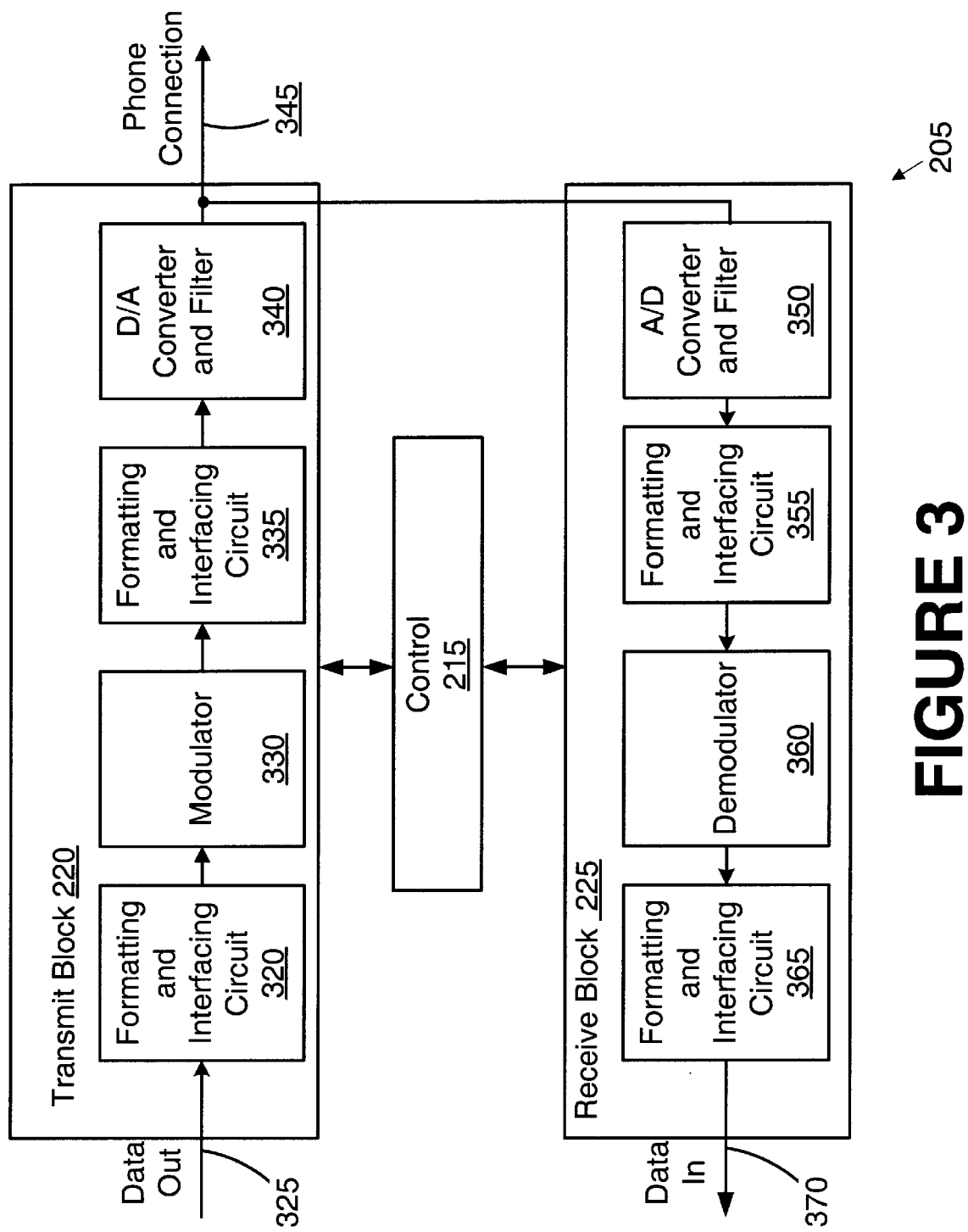
FIG. 3 illustrates a stylized block diagram of a host modem of the communications system of FIG. 2 in accordance with the present invention.

Turning now to FIG. 3, a simplified block diagram of the host modem 205 is provided in accordance with the present invention. For clarity and ease of illustration, not all functional blocks are illustrated in detail since these items are known to one of ordinary skill in the art, and are further defined in documents such as the aforementioned ANSI T1.413 Issue 2 standard.

The host modem 205 includes transmit and receive functional blocks 305, 310, as well as a control block 315 to control their functions. The control block, as described in more detail below, allows the host modem 205 to support one or more of the user modems 210(a–n) in accordance with the present invention. The transmit block 305 includes a formatting and interfacing circuit 320 adapted to receive outgoing digital data over a data-out line 325. The formatting and interfacing circuit 320 performs functions such as cyclic redundancy checking (CRC), scrambling, forward error correction, and interleaving. As stated above, these functions are known to those of ordinary skill in the art, and are fully disclosed in the ANSI T1.413 Issue 2 standard.

The transmit block 305 also includes a modulator 330. The modulator 330 receives data from the formatting and interfacing circuit 320, performs tone ordering, constellation encoding, and gain scaling functions in accordance with the number of available tones, and modulates the tone carriers with the transmitted data. A second data formatting and interfacing circuit 335, within the transmit block 305, inserts a cyclic prefix to the output of the modulator 330. The formatting and interfacing circuit 335 also buffers the output samples. The digital to analog (D/A) converter and filter 340 converts the digital output samples from the formatting and interfacing circuit 335 to an analog waveform suitable for transmission over a phone connection 345. The phone connection 345 couples between the user and most modems 105, 110.

The receive block 310 includes an analog-to-digital (A/D) converter and filter 350 that receives an analog waveform over the phone connection 345 and samples the analog waveform to generate a digital signal. A formatting and interfacing circuit 355 performs the functions known in the art such as frame alignment and time domain equalization. In time domain equalization, because the tones are at different frequencies, certain frequencies travel faster than others. As such, all the tones do not arrive at the same time. The time domain equalization function of the formatting and interfacing circuit 355 delays the faster tones to compensate for the propagation speed differences. The formatting and interfacing circuit 355 also performs gain control to increase the amplitude of the received signal.

A demodulator 360 receives digital signal data from the formatting and interfacing circuit 355 and converts the time domain data from the formatting and interfacing circuit 365 to frequency domain data to recover the tones. The demodulator 360 performs a slicing function to determine constellation points from the constellation encoded data, a demapping function to map the identified constellation point back to bits, and a decoding function (e.g., Viterbi decoding, if trellis constellation coding is employed). The demodulator 360 also performs tone deordering to reassemble the serial bytes that were divided among the available tones. A second formatting and interfacing circuit 365 in the receive block 310 performs forward error correction, CRC checking, and descrambling functions on the data received from the demodulator 360. The reconstructed data provided by the formatting and interfacing circuit 365 represents the sequential binary data that was sent by the "interfacing" modem 105, 110. The reconstructed data is provided to a data-in line 370.

Figure 4:
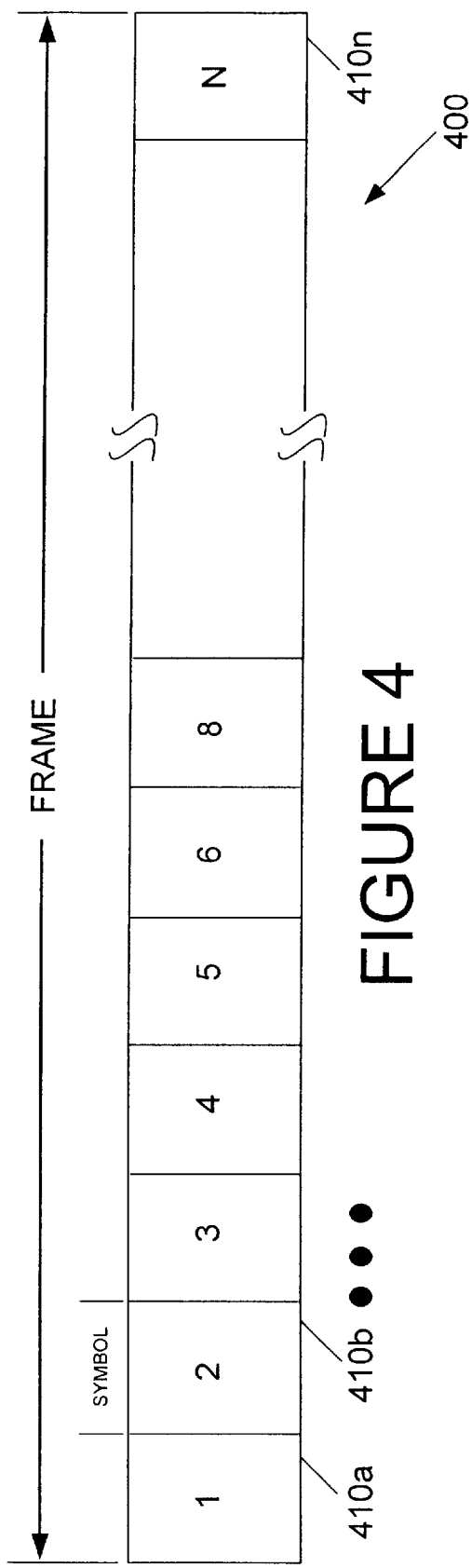
FIG. 4 depicts a standard DMT frame utilized for data communications between the host and user modems of FIG. 3.
Figure 5:
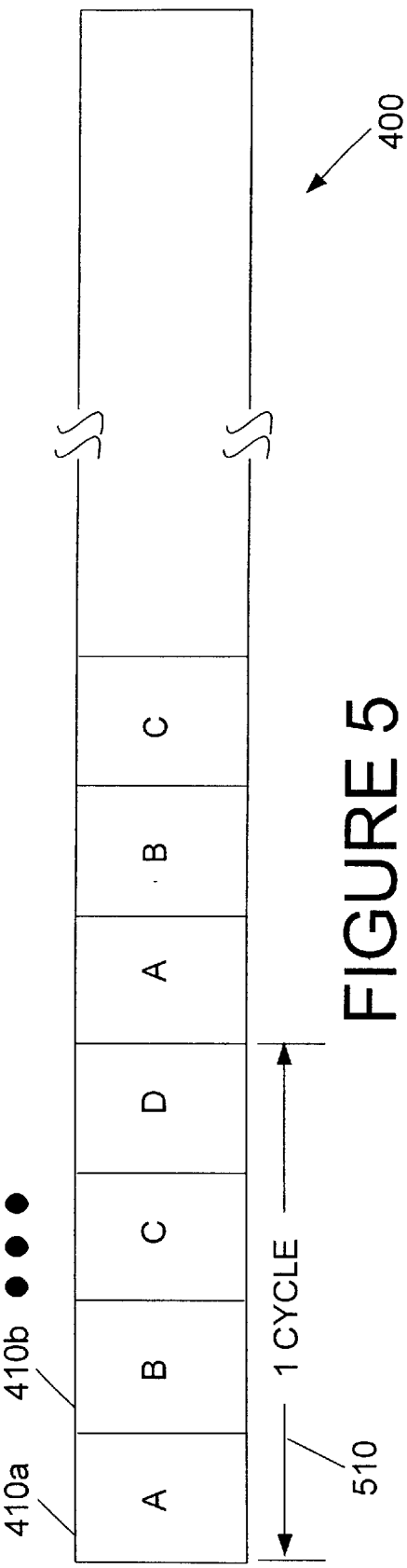
FIG. 5 illustrates an allocation of symbols of the DMT frame of FIG. 4 in accordance with the present invention.

To provide ADSL service to a larger number of users, the host modem 205 utilizes time-division multiplexing, a process well known in the art, to support more than one user modem 210(a–n). FIG. 4 illustrates a typical ADSL TDM frame 400, which comprises a plurality of symbols 410 (a–n), that is utilized for data communications between the host modem 205 and the user modem 210(a–n). The term "symbol" 410(a–n) herein refers to a set of time domain samples produced by the modulator 330. These include the cyclic prefix, and, for the downstream case, in a full-rate host and user modems 205, 210, the number of samples equal 544 (i.e., 512+32). A new symbol 410(a–n) is output every 250 μs (at a rate of 4000 per second). A symbol 410(a–n) carries a total bit load equal to the sum of the numbers of bits used to modulate each carrier. A symbol 410(a–n) is a supposition of all the modulated carriers. In accordance with the present invention, the host modem 205 allocates a selected number of symbols 410(a–n) of the TDM frame 400 to each user modem 210(a–n) seeking a connection to the host modem 205. For illustrative purposes, it is assumed that four user modems 210(a–d) seek a connection to the host modem 205. FIG. 5 illustrates one example of allocating the symbols 410(a–n) of the DMT frame 400 for servicing four user modems 210(a–d). The letters "A" through "D," as utilized herein, represent the symbol 410(a–n) of the DMT frame 400 that is allocated to the four user modems 210(a–b). Accordingly, the symbol 410a identified by an "A" is allocated to the first user modem 210a, the symbol 410a identified by an "B" is allocated to the second user modem 210b, and so forth. Although, the instant embodiment illustrates four users, it is contemplated that additional or fewer user modems 210 (a–n) can be supported by allocating the available symbols 410(a–n) of the DMT frame 400 amongst the user modems 210(a–n) seeking to connect to the host modem 205.

Figure 6:
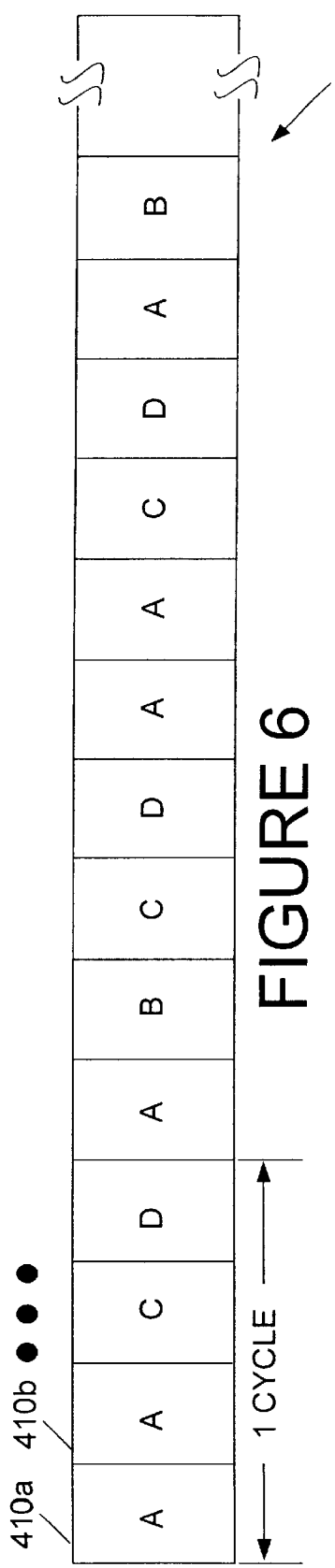
FIG. 6 illustrates an alternative allocation of symbols of the DMT frame of FIG. 4 in accordance with the present invention when all symbols are utilized.

In the illustrated embodiment of FIG. 5, all four users are serviced by the host modem 205 at equal symbol rates. That is, the symbols 410(a–n) of the DMT frame 400 are shared equally by all four user modems 210(a–d) for a given cycle 510. FIG. 6, on the other hand, illustrates an alternative arrangement where the first user modem 210a has a 50 percent higher symbol rate than the second user modem 210b. The symbol rate allocated to each user modem 210 (a–d) may be determined according to a priority scheme. That is, based on a priority scheme, the control block 315 of the host modem 205 determines how many symbols 410 (a–n) to allocate per user modem 210(a–d) in a situation where multiple user modems 210(a–d) seek to be serviced by the host modem 205. The allocation of symbols 410(a–n) to a particular user modem 210(a–d) can be a dynamic process, as described in more detail below. Once at least one symbol 410 (a–n) of the DMT frame 400 is allocated to the user modem 210(a–d), the transmit block 230(a–d) (see FIG. 2) and the receive block 240(a–d) of the user modem 210(a–d) are capable of communicating with the host modem 205 over the allocated symbol 410(a–n), or symbols 410(a–n), if more than one is allocated per frame 400.

Figure 7A:
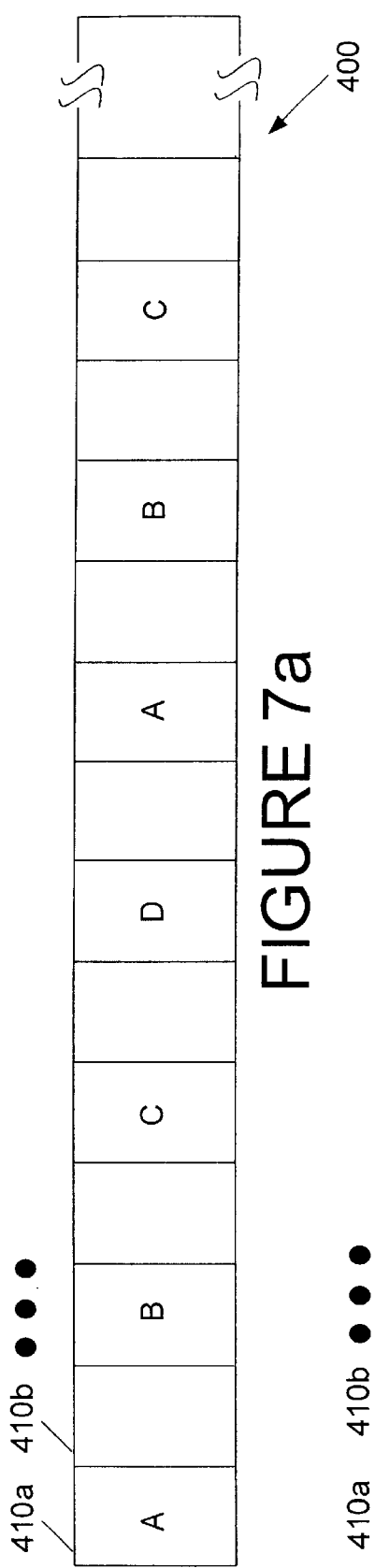
FIGS. 7a and 7b illustrate an example of an allocation of symbols of the DMT frame in accordance with the present invention when some symbols are unused.
Figure 7B:
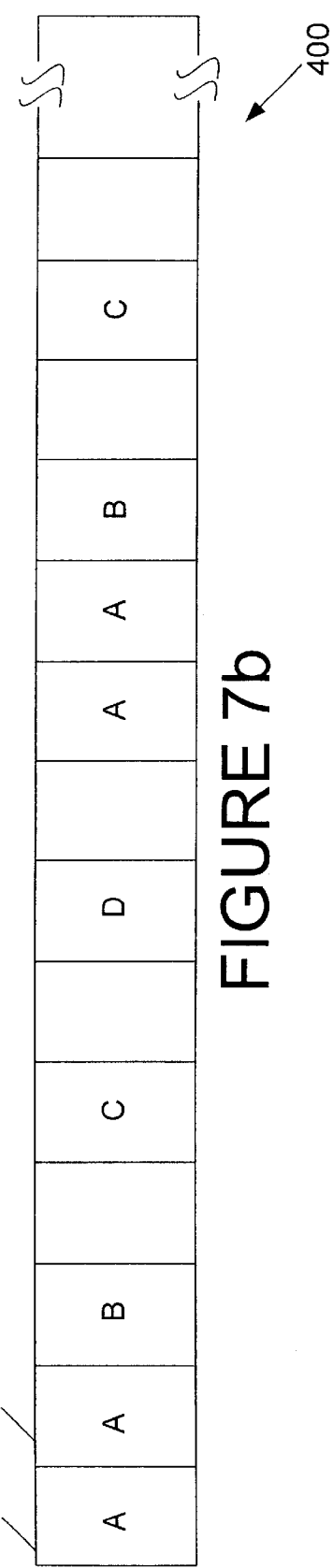

When a user requests a higher data rate, two extreme scenarios may exist. The first scenario is exemplified in FIGS. 7a and 7b. In the first scenario, as seen in FIG. 7a, there exists at least one unused symbol (410b, 410d, etc.) that may be allocated to the user modem 210(a–d) that is requesting a high data rate. The unused symbols (410b, 410d, etc.) may exist because the other users may be operating at low rates. Thus, in response to a request for a higher data rate, the control block 315 of the host modem 205 simply assigns the unused symbols (410b, 410d, etc.) to the requesting user modem 210(a–d), as seen in FIG. 7b, where at least one of the unused symbols (410b, 410d, etc.) is allocated to the first user modem 410a. However, in the second scenario where all the symbols 410(a–n) of the DMT frame 400 are in use (i.e., there are no unused symbols), the control block 315 cannot allocate additional symbols 410 (a–n) in response to a request for higher symbol rate. Accordingly, in order to accommodate the request for a higher symbol rate, the control block 315 of the host modem 205 must reduce the data rate of an existing user modem 210(a–d), which, in one embodiment, may be accomplished based on a priority scheme. For example, some users may desire a cheaper ADSL service, which may result in lower "average" data rates during peak times. On the other hand, some users may desire a more expensive ADSL service that provides a larger "average" data rate, even during peak times.

A variety of methods are contemplated to enable the host modem 205 to incorporate new users, as well as to adjust the symbol rates of the users. In one embodiment, at least one fixed symbol (e.g., a designated symbol) 410(a–n) within the DMT frame 400 may be reserved for transmitting control signals to and from the host modem 205. As an example, in one embodiment, the control block 220(a–d) of the user modem 210(a–d) requesting ADSL service from the host modem 205 may monitor the designated symbol 410(a–n). The designated symbol 410(a–n), if not in use, may be utilized by the control block 220(a–d) of the user modem 410(a–d) for transmitting and/or receiving control signals to and from the host modem 205. The control signals may include information such the transmission rate, the priority scheme (i.e., class of ADSL service), and the like. The host modem 205 may transmit additional control signals to the user modems 210(a–d), wherein the control signals specify the DMT symbol allocation for actual data transmission.

In an alternate embodiment, the host modem and the user modems 205, 210(a–d) may transmit control signals using voice band signaling. That is, the control block 315 of the host modem 205 may be adapted to transmit and receive control signals in the voice band (i.e., lower frequency band). Likewise, the user modems 210(a–d) may be adapted to transmit and receive signals in the voice band as well. Thus, in one embodiment, control signals which may include information such as the desired transmission rate, the priority scheme, the actual data transmission rate, and so forth, may be transmitted and received in the voice band. An added benefit of using voice-band signaling for transmission and reception of control signals is that the control signals generally will not affect the digital data transmission rate, because digital data is transmitted at higher frequencies than the voice band.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for supporting a plurality of user transceivers with a host transceiver, comprising:
    allocating at least one symbol of a DMT frame to a first user transceiver of the plurality of transceivers;
    providing a control signal from a second user transceiver of the plurality of transceivers to the host transceiver; and
    allocating at least one symbol of the DMT frame to the second user transceiver in response to the control signal.

2. The method of claim 1, wherein allocating at least one symbol of a DMT frame to a first user transceiver and a second user transceiver comprises allocating at least one symbol using time-division multiplexing.

3. The method of claim 2, wherein providing a control signal comprises providing the control signal using a designated symbol of the DMT frame.

4. The method of claim 3, wherein the control signal comprises a request to add a new user.

5. The method of claim 3, wherein the control signal comprises a request to adjust the data transmission rate.

6. The method of claim 5, wherein allocating at least one symbol of the DMT frame to the second user transceiver comprises:
    determining if at least one unused symbol exists within the DMT frame; and
    allocating at least one unused symbol based on a priority scheme in response to the request to adjust the transmission rate and in response to determining that at least one unused symbol exists.

7. The method of claim 6, wherein the priority scheme includes reducing the symbol rate of a user having lower priority in response to the request to adjust the transmission rate and in response to determining that no unused symbols exist within the DMT frame.

8. The method of claim 6, wherein the priority scheme includes increasing the symbol rate of a user having higher priority in response to the request to adjust the transmission rate and in response to determining that no unused symbols exist within the DMT frame.

9. The method of claim 2, wherein providing a control signal comprises providing the control signal using voice-band signaling.

10. The method of claim 9, wherein the control signal comprises a request to add a new user.

11. The method of claim 9, wherein the control signal comprises a request to adjust the data transmission rate.

12. An apparatus, comprising:
    a transmit block capable of transmitting data within a first portion of a DMT frame to a first user transceiver over a first connection; and
    a control block adapted to receive a control signal over a second connection, the control block capable of allocating a second portion of the DMT frame to a second user transceiver for data transmission in response to the control signal.

13. The apparatus of claim 12, wherein the control block is capable of allocating the second portion of the DMT frame using time-division multiplexing.

14. The apparatus of claim 13, wherein the transmit block is capable of transmitting data within a first portion of a DMT frame includes transmitting data over at least one symbol of the DMT frame.

15. The apparatus of claim 13, wherein the control block is capable of allocating a second portion of a DMT frame includes the control block capable of allocating at least one symbol of the DMT frame to the second user transceiver.

16. The apparatus of claim 15, wherein the control block is capable of allocating at least one symbol of the DMT frame to the second user transceiver includes the control block capable of:
    determining if at least one unused symbol exists within the DMT frame; and
    allocating at least one unused symbol based on a priority scheme in response to the request to adjust the transmission rate and in response to determining that at least one unused symbol exists.

17. The apparatus of claim 16, wherein the control block is adapted to receive a control signal includes receiving the control signal over a designated symbol of the DMT frame.

18. The apparatus of claim 17, wherein the control signal comprises a request to add a new user.

19. The apparatus of claim 17, wherein the control signal comprises a request to adjust the data transmission rate.

20. The apparatus of claim 16, wherein the control block is adapted to receive a control signal includes receiving the control signal using voice band signaling.

21. The apparatus of claim 20, wherein the control signal comprises a request to add a new user.

22. The apparatus of claim 20, wherein the control signal comprises a request to adjust the data transmission rate.

23. The apparatus of claim 12, further including a receive block capable of receiving data within the first portion of a DMT frame from the first user transceiver over the second connection.

24. An apparatus, comprising:
   a control block capable of identifying a portion of a DMT frame allocated for data communications, wherein the control block capable of identifying a portion of a DMT frame includes the control block identifying at least one symbol of the DMT frame that is allocated for data communications; and
   a receive block capable of receiving data within the allocated portion of the DMT frame.

25. The apparatus of claim 24, wherein the control block is capable of transmitting a control signal to a transceiver, the control signal comprising a request to connect to the transceiver.

26. The apparatus of claim 24, wherein the control block is capable of transmitting a control signal to a transceiver, the control signal comprising a request to increase data transmission rate.

27. The apparatus of claim 24, further including a transmit block capable of transmitting data within the allocated portion of the DMT frame.

28. A method, comprising:
   providing information in a first number of symbols of a DMT frame to a first user transceiver;
   providing information in a second number of symbols of the DMT frame to a second user transceiver;
   receiving a request to adjust a data transmission rate from the first user transceiver; and
   providing information in a different number of symbols from the first number of symbols in response to receiving the request to adjust the data transmission rate.

29. The method of claim 28, wherein the request is received over a dedicated symbol.

30. The method of claim 28, wherein the request is received in a voice band range.

31. The method of claim 28, wherein providing information in the first number of symbols comprises providing the information over all available tones in each symbol.

32. A method, comprising:
   allocating a first DMT symbol rate to a first user transceiver;
   allocating a second DMT symbol rate to a second user transceiver;
   adjusting at least one of the first DMT symbol rate and the second DMT symbol rate in response to receiving a control signal from one of the transceivers.

33. The method of claim 32, wherein adjusting at least one of the first DMT symbol rate and the second DMT symbol rate comprises increasing at least one of the first DMT symbol rate and the second DMT symbol rate in response to receiving the control signal.

34. The method of claim 32, wherein adjusting at least one of the first DMT symbol rate and the second DMT symbol rate comprises adjusting at least one of the first DMT symbol rate and the second DMT symbol rate based on a class of service.

35. The method of claim 32, wherein receiving the control signal comprises receiving the control signal in a voice band.

36. The method of claim 32, wherein receiving the control signal comprises receiving the control signal in a preselected DMT symbol.

\* \* \* \* \*